(12) United States Patent
Xie et al.

(10) Patent No.: US 9,167,664 B2
(45) Date of Patent: Oct. 20, 2015

(54) SYSTEMS AND METHODS FOR LOW-POWER LAMP COMPATIBILITY WITH A TRAILING-EDGE DIMMER AND AN ELECTRONIC TRANSFORMER

(71) Applicant: Cirrus Logic, Inc., Austin, TX (US)

(72) Inventors: Yanhui Xie, Austin, TX (US); Eric Jerome King, Dripping Springs, TX (US); John L. Melanson, Austin, TX (US); Michael A. Kost, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 196 days.

(21) Appl. No.: 13/798,926

(22) Filed: Mar. 13, 2013

(65) Prior Publication Data

US 2014/0009078 A1 Jan. 9, 2014

Related U.S. Application Data

(60) Provisional application No. 61/667,685, filed on Jul. 3, 2012, provisional application No. 61/673,111, filed on Jul. 18, 2012.

(51) Int. Cl.
*H05B 37/02* (2006.01)
*H05B 33/08* (2006.01)

(52) U.S. Cl.
CPC ............ *H05B 37/02* (2013.01); *H05B 33/0803* (2013.01); *H05B 33/0809* (2013.01); *H05B 33/0845* (2013.01); *Y02B 20/383* (2013.01)

(58) Field of Classification Search
CPC .... H05B 37/02; H05B 33/08; H05B 33/0818; H05B 33/0845; H02M 3/33507
USPC ...... 315/209 R, 276, 291, 307, 308, 224, 225
See application file for complete search history.

(56) References Cited

U.S. PATENT DOCUMENTS

| 4,562,382 A | 12/1985 | Elliott |
| 5,040,236 A | 8/1991 | Costello |
| 5,416,387 A | 5/1995 | Cuk et al. |

(Continued)

FOREIGN PATENT DOCUMENTS

| EP | 2590477 A1 | 5/2013 |
| WO | 2011063205 A1 | 5/2011 |

(Continued)

OTHER PUBLICATIONS

International Search Report and Written Opinion, International Patent Application No. PCT/US2013/047777.

(Continued)

*Primary Examiner* — Jimmy Vu
(74) *Attorney, Agent, or Firm* — Jackson Walker L.L.P.

(57) ABSTRACT

In accordance with these and other embodiments of the present disclosure, a system and method for providing compatibility between a load and a secondary winding of an electronic transformer driven by a trailing-edge dimmer may include predicting based on an electronic transformer secondary signal an estimated occurrence of a high-resistance state of the trailing-edge dimmer, wherein the high-resistance state occurs when the trailing-edge dimmer begins phase-cutting an alternating current voltage signal and operating the load in a high-current mode for a period of time immediately prior to the estimated occurrence of the high-resistance state.

30 Claims, 11 Drawing Sheets

(56) References Cited

U.S. PATENT DOCUMENTS

| | | | |
|---|---|---|---|
| 6,407,935 | B1 | 6/2002 | Chang et al. |
| 7,812,550 | B2 | 10/2010 | Harmgardt et al. |
| 8,067,902 | B2 | 11/2011 | Newman, Jr. et al. |
| 8,212,491 | B2 | 7/2012 | Kost et al. |
| 8,653,759 | B2 | 2/2014 | Vigh et al. |
| 8,664,883 | B2 * | 3/2014 | Hiramatu et al. ............. 315/291 |
| 8,716,957 | B2 | 5/2014 | Melanson et al. |
| 8,723,431 | B2 | 5/2014 | Deppe et al. |
| 8,933,648 | B1 | 1/2015 | Putman et al. |
| 2003/0127994 | A1 | 7/2003 | Patchornik et al. |
| 2003/0151931 | A1 | 8/2003 | Kohno |
| 2007/0040516 | A1 | 2/2007 | Chen |
| 2007/0076459 | A1 | 4/2007 | Limpkin |
| 2007/0262654 | A1 | 11/2007 | Mosebrook et al. |
| 2007/0285028 | A1 | 12/2007 | Tsinker et al. |
| 2008/0024074 | A1 | 1/2008 | Mosebrook et al. |
| 2009/0184662 | A1 | 7/2009 | Given et al. |
| 2010/0141178 | A1 | 6/2010 | Negrete et al. |
| 2010/0225251 | A1 | 9/2010 | Maruyama |
| 2011/0012530 | A1 | 1/2011 | Zheng et al. |
| 2011/0115400 | A1 | 5/2011 | Harrison et al. |
| 2011/0121751 | A1 | 5/2011 | Harrison et al. |
| 2011/0121752 | A1 | 5/2011 | Newman, Jr. et al. |
| 2011/0199017 | A1 | 8/2011 | Dilger |
| 2011/0210674 | A1 | 9/2011 | Melanson |
| 2012/0025729 | A1 | 2/2012 | Melanson et al. |
| 2012/0043913 | A1 | 2/2012 | Melanson |
| 2012/0049752 | A1 | 3/2012 | King et al. |
| 2012/0098454 | A1 | 4/2012 | Grotkowski et al. |
| 2012/0106216 | A1 | 5/2012 | Tzinker et al. |
| 2012/0112638 | A1 | 5/2012 | Melanson et al. |
| 2012/0112648 | A1 | 5/2012 | Hariharan |
| 2012/0119669 | A1 | 5/2012 | Melanson et al. |
| 2012/0139431 | A1 | 6/2012 | Thompson et al. |
| 2012/0146546 | A1 | 6/2012 | Hu et al. |
| 2012/0169240 | A1 | 7/2012 | Macfarlane |
| 2012/0229041 | A1 | 9/2012 | Saes et al. |
| 2012/0230073 | A1 | 9/2012 | Newman, Jr. et al. |
| 2012/0242238 | A1 | 9/2012 | Chen et al. |
| 2012/0286684 | A1 | 11/2012 | Melanson et al. |
| 2012/0286696 | A1 | 11/2012 | Ghanem |
| 2012/0286826 | A1 | 11/2012 | King et al. |
| 2012/0299501 | A1 | 11/2012 | Kost et al. |
| 2013/0113458 | A1 | 5/2013 | Riesebosch |
| 2013/0278159 | A1 | 10/2013 | Del Carmen, Jr. et al. |
| 2014/0009079 | A1 | 1/2014 | Xie et al. |
| 2014/0009082 | A1 | 1/2014 | King et al. |
| 2014/0028214 | A1 | 1/2014 | Mazumdar et al. |
| 2014/0167639 | A1 | 6/2014 | King et al. |
| 2014/0167652 | A1 | 6/2014 | King et al. |
| 2014/0333205 | A1 | 11/2014 | Kost et al. |
| 2015/0061536 | A1 | 3/2015 | Xie et al. |

FOREIGN PATENT DOCUMENTS

| | | |
|---|---|---|
| WO | 2011111005 A1 | 9/2011 |
| WO | 2013090904 A1 | 6/2013 |

OTHER PUBLICATIONS

International Search Report and Written Opinion, International Patent Application No. PCT/US20131047844, mailed Jul. 23, 2014, 14 pages.

International Search Report and Written Opinion, International Patent Application No. PCT/US20141032182, mailed Jul. 24, 2014, 10 pages.

International Search Report and Written Opinion, International Patent Application No. PCT/US20131071690, mailed Jun. 4, 2014, 13 pages.

International Search Report and Written Opinion, International Patent Application No. PCT/US20141037864, mailed Sep. 29, 2014, 8 pages.

* cited by examiner

SYSTEMS AND METHODS FOR LOW-POWER LAMP COMPATIBILITY WITH A TRAILING-EDGE DIMMER AND AN ELECTRONIC TRANSFORMER

RELATED APPLICATIONS

The present disclosure claims priority to U.S. Provisional Patent Application Ser. No. 61/673,111, filed Jul. 18, 2012, which is incorporated by reference herein in its entirety.

The present disclosure also claims priority to U.S. Provisional Patent Application Ser. No. 61/667,685, filed Jul. 3, 2012, which is incorporated by reference herein in its entirety.

The present disclosure is related to U.S. patent application Ser. No. 13/799,329, filed Mar. 13, 2013, and U.S. patent application Ser. No. 13/799,010, filed Mar. 13, 2013, both which are incorporated by reference herein in their entirety.

FIELD OF DISCLOSURE

The present disclosure relates in general to the field of electronics, and more specifically to systems and methods for ensuring compatibility between one or more a low-power lamps and the power infrastructure to which they are coupled.

BACKGROUND

Many electronic systems include circuits, such as switching power converters or transformers that interface with a dimmer. The interfacing circuits deliver power to a load in accordance with the dimming level set by the dimmer. For example, in a lighting system, dimmers provide an input signal to a lighting system. The input signal represents a dimming level that causes the lighting system to adjust power delivered to a lamp, and, thus, depending on the dimming level, increase or decrease the brightness of the lamp. Many different types of dimmers exist. In general, dimmers generate an output signal in which a portion of an alternating current ("AC") input signal is removed or zeroed out. For example, some analog-based dimmers utilize a triode for alternating current ("triac") device to modulate a phase angle of each cycle of an alternating current supply voltage. This modulation of the phase angle of the supply voltage is also commonly referred to as "phase cutting" the supply voltage. Phase cutting the supply voltage reduces the average power supplied to a load, such as a lighting system, and thereby controls the energy provided to the load.

A particular type of a triac-based, phase-cutting dimmer is known as a leading-edge dimmer. A leading-edge dimmer phase cuts from the beginning of an AC cycle, such that during the phase-cut angle, the dimmer is "off" and supplies no output voltage to its load, and then turns "on" after the phase-cut angle and passes phase cut input signal to its load. To ensure proper operation, the load must provide to the leading-edge dimmer a load current sufficient to maintain an inrush current above a current necessary for opening the triac. Due to the sudden increase in voltage provided by the dimmer and the presence of capacitors in the dimmer, the current that must be provided is typically substantially higher than the steady state current necessary for triac conduction. Additionally, in steady state operation, the load must provide to the dimmer a load current to remain above another threshold known as a "hold current" needed to prevent premature disconnection of the triac.

FIG. 1 depicts a lighting system 100 that includes a triac-based leading-edge dimmer 102 and a lamp 142. FIG. 2 depicts example voltage and current graphs associated with lighting system 100. Referring to FIGS. 1 and 2, lighting system 100 receives an AC supply voltage $V_{SUPPLY}$ from voltage supply 104. The supply voltage $V_{SUPPLY}$ is, for example, a nominally 60 Hz/110 V line voltage in the United States of America or a nominally 50 Hz/220 V line voltage in Europe. Triac 106 acts as a voltage-driven switch, and a gate terminal 108 of triac 106 controls current flow between the first terminal 110 and the second terminal 112. A gate voltage $V_G$ on the gate terminal 108 above a firing threshold voltage value $V_F$ will cause triac 106 to turn ON, in turn causing a short of capacitor 121 and allowing current to flow through triac 106 and dimmer 102 to generate an output current $i_{DIM}$.

Assuming a resistive load for lamp 142, the dimmer output voltage $V_{\Phi\_DIM}$ is zero volts from the beginning of each of half cycles 202 and 204 at respective times $t_0$ and $t_2$ until the gate voltage $V_G$ reaches the firing threshold voltage value $V_F$. Dimmer output voltage $V_{\Phi\_DIM}$ represents the output voltage of dimmer 102. During timer period $t_{OFF}$, the dimmer 102 chops or cuts the supply voltage $V_{SUPPLY}$ so that the dimmer output voltage $V_{\Phi\_DIM}$ remains at zero volts during time period $t_{OFF}$. At time $t_1$, the gate voltage $V_G$ reaches the firing threshold value $V_F$, and triac 106 begins conducting. Once triac 106 turns ON, the dimmer voltage $V_{\Phi\_DIM}$ tracks the supply voltage $V_{SUPPLY}$ during time period $t_{ON}$.

Once triac 106 turns ON, the current $i_{DIM}$ drawn from triac 106 must exceed an attach current $i_{ATT}$ in order to sustain the inrush current through triac 106 above a threshold current necessary for opening triac 106. In addition, once triac 106 turns ON, triac 106 continues to conduct current $i_{DIM}$ regardless of the value of the gate voltage $V_G$ as long as the current $i_{DIM}$ remains above a holding current value $i_{HC}$. The attach current value $i_{ATT}$ and the holding current value $i_{HC}$ is a function of the physical characteristics of the triac 106. Once the current $i_{DIM}$ drops below the holding current value $i_{HC}$, i.e. $i_{DIM} < i_{HC}$, triac 106 turns OFF (i.e., stops conducting), until the gate voltage $V_G$ again reaches the firing threshold value $V_F$. In many traditional applications, the holding current value $i_{HC}$ is generally low enough so that, ideally, the current $i_{DIM}$ drops below the holding current value $i_{HC}$ when the supply voltage $V_{SUPPLY}$ is approximately zero volts near the end of the half cycle 202 at time $t_2$.

The variable resistor 114 in series with the parallel connected resistor 116 and capacitor 118 form a timing circuit 115 to control the time $t_1$ at which the gate voltage $V_G$ reaches the firing threshold value $V_F$. Increasing the resistance of variable resistor 114 increases the time $t_{OFF}$, and decreasing the resistance of variable resistor 114 decreases the time $t_{OFF}$. The resistance value of the variable resistor 114 effectively sets a dimming value for lamp 142. Diac 119 provides current flow into the gate terminal 108 of triac 106. The dimmer 102 also includes an inductor choke 120 to smooth the dimmer output voltage $V_{\Phi\_DIM}$. Triac-based dimmer 102 also includes a capacitor 121 connected across triac 106 and inductor choke 120 to reduce electro-magnetic interference.

Ideally, modulating the phase angle of the dimmer output voltage $V_{\Phi\_DIM}$ effectively turns the lamp 142 OFF during time period $t_{OFF}$ and ON during time period $t_{ON}$ for each half cycle of the supply voltage $V_{SUPPLY}$. Thus, ideally, the dimmer 102 effectively controls the average energy supplied to lamp 142 in accordance with the dimmer output voltage $V_{\Phi\_DIM}$.

The triac-based dimmer 102 adequately functions in many circumstances, such as when lamp 142 consumes a relatively high amount of power, such as an incandescent light bulb. However, in circumstances in which dimmer 102 is loaded with a lower-power load (e.g., a light-emitting diode or LED lamp), such load may draw a small amount of current $i_{DIM}$, and it is possible that the current $i_{DIM}$ may fail to reach the attach current $i_{ATT}$ and also possible that current $i_{DIM}$ may prematurely drop below the holding current value $i_{HC}$ before the supply voltage $V_{SUPPLY}$ reaches approximately zero volts. If the current $i_{DIM}$ fails to reach the attach current $i_{ATT}$, dimmer 102 may prematurely disconnect and may not pass the appropriate portion of input voltage $V_{SUPPLY}$ to its output. If the current $i_{DIM}$ prematurely drops below the holding current value $i_{HC}$, the dimmer 102 prematurely shuts down, and the dimmer voltage $V_{\Phi\_DIM}$ will prematurely drop to zero. When the dimmer voltage $V_{\Phi\_DIM}$ prematurely drops to zero, the dimmer voltage $V_{\Phi\_DIM}$ does not reflect the intended dimming value as set by the resistance value of variable resistor 114. For example, when the current $i_{DIM}$ drops below the holding current value $i_{HC}$ at a time significantly earlier than $t_2$ for the dimmer voltage $V_{\Phi\_DIM}$ 206, the ON time period $t_{ON}$ prematurely ends at a time earlier than $t_2$ instead of ending at time $t_2$, thereby decreasing the amount of energy delivered to the load. Thus, the energy delivered to the load will not match the dimming level corresponding to the dimmer voltage $V_{\Phi\_DIM}$. In addition, when $V_{\Phi\_DIM}$ prematurely drops to zero, charge may accumulate on capacitor 118 and gate 108, causing triac 106 to again refire if $V_G$ exceeds $V_F$ during the same half cycle 202 or 204, and/or causing triac 106 to fire incorrectly in subsequent half cycles due to such accumulated charge. Thus, premature disconnection of triac 106 may lead to errors in the timing circuitry of dimmer 102 and instability in its operation.

Dimming a light source with dimmers saves energy when operating a light source and also allows a user to adjust the intensity of the light source to a desired level. However, conventional dimmers, such as a triac-based leading-edge dimmer, that are designed for use with resistive loads, such as incandescent light bulbs, often do not perform well when attempting to supply a raw, phase modulated signal to a reactive load such as an electronic power converter or transformer.

Transformers present in a power infrastructure may include magnetic or electronic transformers. A magnetic transformer typically comprises two coils of conductive material (e.g., copper) each wrapped around of core of material having a high magnetic permeability (e.g., iron) such that magnetic flux passes through both coils. In operation an electric current in the first coil may produce a changing magnetic field in the core, such that the changing magnetic field induces a voltage across the ends of the secondary winding via electromagnetic induction. Thus, a magnetic transformer may step voltage levels up or down while providing electrical isolation in a circuit between components coupled to the primary winding and components coupled to the secondary winding.

On the other hand, an electronic transformer is a device which behaves in the same manner as a conventional magnetic transformer in that it steps voltage levels up or down while providing isolation and can accommodate load current of any power factor. An electronic transformer generally includes power switches which convert a low-frequency (e.g., direct current to 400 Hertz) voltage wave to a high-frequency voltage wave (e.g., in the order of 10,000 Hertz). A comparatively small magnetic transformer may be coupled to such power switches and thus provides the voltage level transformation and isolation functions of the conventional magnetic transformer.

FIG. 3 depicts a lighting system 101 that includes a triac-based leading-edge dimmer 102 (e.g., such as that shown in FIG. 1), a magnetic transformer 122, and a lamp 142. Such a system may be used, for example, to transform a high voltage (e.g., 110V, 220 V) to a low voltage (e.g., 12 V) for use with a halogen lamp (e.g., an MR16 halogen lamp). FIG. 4 depicts example voltage and current graphs associated with lighting system 101. Referring to FIGS. 3 and 4, when dimmer 102 is used in connection with transformer 122 and a low-power lamp 142, the low power draw of lamp 142 may cause insufficient current $i_{DIM}$ to be drawn from dimmer 102 in order to meet the attach current and/or hold current requirements.

To further illustrate this potential problem, an equivalent circuit model for transformer 122 that represents the physical behavior of a magnetic transformer is depicted in FIG. 3. Parasitic effects present in transformer 122 are represented in an equivalent circuit model for transformer 122 by a primary side parasitic inductance 124 (with an inductance $L_p$) in series with a primary side parasitic resistance 126 (with a resistance $R_p$) and a secondary side parasitic inductance 132 (with an inductance $L_s$) in series with a secondary side parasitic resistance 134 (with an resistance $R_s$), which model losses and leakage reactances of the transformer coils. Parasitic effects are also represented by a "magnetizing branch" of the model comprising shunt leg parasitic inductance 128 (with an inductance $L_m$) in parallel with a shunt leg parasitic resistance 130 (with a resistance $R_m$), which model losses and leakage reactances of the transformer core. A magnetizing current $I_m$ flows to the shunt leg reactance representing current required to maintain mutual magnetic flux in the core. Those of ordinary skill in the art will appreciate that $i_{DIM}=i_s/N+i_m$, where $i_s$ is a secondary current of transformer 122 and N is the turns ratio of the transformer's primary and second side windings.

FIG. 4 depicts example waveforms for dimmer 102 output voltage $V_{\Phi\_DIM}$ 402, secondary voltage $V_s$ 404, magnetizing current $i_m$ 406, and the current $i_s/N$ 408 through the primary winding of transformer 122, assuming a three-wire dimmer. When loaded with transformer 122, the waveform $V_{\Phi\_DIM}$ 402 shown in FIG. 4 differs from that of waveform $V_{\Phi\_DIM}$ 206 shown in FIG. 2 due to reactances present in transformer 122, and in particular the presence of magnetizing current $I_m$. Starting at time $t_0$ in half cycle 410, despite a zero voltage $V_{\Phi\_DIM}$ at $t_0$, a magnetizing current $i_m$ 406 remains flowing in transformer 122 and may account for significantly all of the current $i_{DIM}$, thus inducing a voltage $V_s$ 404 rising in magnitude. At such time $t_0$, primary winding current $i_s/N$ may also begin increasing above zero. At a time $t_3$ occurring between time $t_0$ and time $t_1$, the sum of magnetizing current $i_m$ and primary winding current $i_s/N$ may reach a point at which the sum $i_{DIM}=i_s/N+i_m$ will decrease to an amount below the hold current $i_{HC}$, and dimmer 102 turns off. At time $t_1$, the dimmer may again turn on (e.g., $i_{DIM}>i_{ATT}$), and a magnetizing current $i_m$ and primary winding current $i_s/N$ may again appear. As seen in FIG. 4, throughout half cycle 412, waveforms 402, 404, and 408 are substantially equal in magnitude than they are throughout half cycle 410, but with opposite polarity. Accordingly, at a time $t_3'$ occurring between time $t_2$ and $t_1'$, the sum of magnetizing current $i_m$ and primary winding current $i_s/N$ may reach a point at which the sum $i_{DIM}=i_s/N+i_m$ will decrease to an amount below the hold current $i_{HC}$, and dimmer 102 turns off. In a three-wire dimmer, the time at which the dimmer turns on (e.g., $t_1$, $t_1'$) within each phase remains consistent, while in a two-wire dimmer, such times may vary from phase to phase.

Another particular type of phase-cutting dimmer is known as a trailing-edge dimmer. A trailing-edge dimmer phase cuts from the end of an AC cycle, such that during the phase-cut angle, the dimmer is "off" and supplies no output voltage to its load, but is "on" before the phase-cut angle and in an ideal case passes a waveform proportional to its input voltage to its load.

FIG. 5 depicts a lighting system 500 that includes a trailing-edge, phase-cut dimmer 502 and a lamp 542. FIG. 6 depicts example voltage and current graphs associated with lighting system 500. Referring to FIGS. 5 and 6, lighting system 500 receives an AC supply voltage $V_{SUPPLY}$ from voltage supply 504. The supply voltage $V_{SUPPLY}$, indicated by voltage waveform 602, is, for example, a nominally 60 Hz/110 V line voltage in the United States of America or a nominally 50 Hz/220 V line voltage in Europe. Trailing edge dimmer 502 phase cuts trailing edges, such as trailing edges 602 and 604, of each half cycle of supply voltage $V_{SUPPLY}$. Since each half cycle of supply voltage $V_{SUPPLY}$ is 180 degrees of the supply voltage $V_{SUPPLY}$, the trailing edge dimmer 502 phase cuts the supply voltage $V_{SUPPLY}$ at an angle greater than 0 degrees and less than 180 degrees. The phase cut, input voltage $V_{\Phi\_DIM}$ to lamp 542 represents a dimming level that causes the lighting system 500 to adjust power delivered to lamp 542, and, thus, depending on the dimming level, increase or decrease the brightness of lamp 542.

Dimmer 502 includes a timer controller 510 that generates dimmer control signal DCS to control a duty cycle of switch 512. The duty cycle of switch 512 is a pulse width (e.g., times $t_1$-$t_0$) divided by a period of the dimmer control signal (e.g., times $t_3$-$t_0$) for each cycle of the dimmer control signal DCS. Timer controller 510 converts a desired dimming level into the duty cycle for switch 512. The duty cycle of the dimmer control signal DCS is decreased for lower dimming levels (i.e., higher brightness for lamp 542) and increased for higher dimming levels. During a pulse (e.g., pulse 606 and pulse 608) of the dimmer control signal DCS, switch 512 conducts (i.e., is "on"), and dimmer 502 enters a low resistance state. In the low resistance state of dimmer 502, the resistance of switch 512 is, for example, less than or equal to 10 ohms. During the low resistance state of switch 512, the phase cut, input voltage $V_{\Phi\_DIM}$ tracks the input supply voltage $V_{SUPPLY}$ and dimmer 502 transfers a dimmer current $i_{DIM}$ to lamp 542.

When timer controller 510 causes the pulse of dimmer control signal 606 to end, dimmer control signal 606 turns switch 512 off, which causes dimmer 502 to enter a high resistance state (i.e., turns off). In the high resistance state of dimmer 502, the resistance of switch 512 is, for example, greater than 1 kiloohm. Dimmer 502 includes a capacitor 514, which charges to the supply voltage $V_{SUPPLY}$ during each pulse of the timer control signal DCS. In both the high and low resistance states of dimmer 502, the capacitor 514 remains connected across switch 512. When switch 512 is off and dimmer 502 enters the high resistance state, the voltage $V_c$ across capacitor 514 increased (e.g., between times $t_1$ and $t_2$ and between times $t_4$ and $t_5$). The rate of increase is a function of the amount of capacitance C of capacitor 514 and the input impedance of lamp 542. If effective input resistance of lamp 542 is low enough, it permits a high enough value of the dimmer current $i_{DIM}$ to allow the phase cut, input voltage $V_{\Phi\_DIM}$ to decay to a zero crossing (e.g., at times $t_2$ and $t_5$) before the next pulse of the dimmer control signal DCS.

Dimming a light source with dimmers saves energy when operating a light source and also allows a user to adjust the intensity of the light source to a desired level. However, conventional dimmers, such as a trailing-edge dimmer, that are designed for use with resistive loads, such as incandescent light bulbs, often do not perform well when supplying a raw, phase modulated signal to a reactive load such as a power converter or transformer, as is discussed in greater detail below.

FIG. 7 depicts a lighting system 500 that includes a trailing-edge, phase-cut dimmer 502, an electronic transformer 522, and a lamp 542. Such a system may be used, for example, to transform a high voltage (e.g., 110V, 220 V) to a low voltage (e.g., 12 V) for use with a halogen lamp (e.g., an MR16 halogen lamp). FIG. 8 depicts example voltage graphs associated with lighting system 501.

As is known in the art, electronic transformers operate on a principle of self-resonant circuitry. Referring to FIGS. 7 and 8, when dimmer 502 is used in connection with transformer 522 and a low-power lamp 542, the low current draw of lamp 542 may be insufficient to allow electronic transformer 522 to reliably self-oscillate.

To further illustrate, electronic transformer 522 may receive the dimmer output voltage $V_{\Phi\_DIM}$ at its input where it is rectified by a full-bridge rectifier formed by diodes 524. As voltage $V_{\Phi\_DIM}$ increases in magnitude, voltage on capacitor 526 may increase to a point where diac 528 will turn on, thus also turning on transistor 529. Once transistor 529 is on, capacitor 526 may be discharged and oscillation will start due to the self-resonance of switching transformer 530, which includes a primary winding ($T_{2a}$) and two secondary windings ($T_{2b}$ and $T_{2c}$). Accordingly, as depicted in FIG. 8, an oscillating output voltage $V_s$ 800 will be formed on the secondary of transformer 532 and delivered to lamp 542 while dimmer 502 is on, bounded by an AC voltage level proportional to $V_{\Phi\_DIM}$.

However, as mentioned above, many electronic transformers will not function properly with low-current loads. With a light load, there may be insufficient current through the switching transformer 530's primary to sustain oscillation. For legacy applications, such as where lamp 542 is a 35-watt halogen bulb, lamp 542 may draw sufficient current to allow transformer 522 to sustain oscillation. However, should a lower-power lamp be used, such as a six-watt LED bulb, the current drawn by lamp 542 may be insufficient to sustain oscillation in transformer 522, which may lead to unreliable effects, such as visible flicker and a reduction in total light output below the level indicated by the dimmer.

In addition, traditional approaches do not effectively detect or sense a type of transformer to which a lamp is coupled, further rendering it difficult to ensure compatibility between low-power (e.g., less than twelve watts) lamps and the power infrastructure to which they are applied.

SUMMARY

In accordance with the teachings of the present disclosure, certain disadvantages and problems associated with ensuring compatibility of a low-power lamp with a dimmer and a transformer may be reduced or eliminated.

In accordance with embodiments of the present disclosure, an apparatus may include a controller to provide compatibility between a load and a secondary winding of a transformer driven at its primary winding by a dimmer, wherein the controller is configured to: determine from a transformer secondary signal whether the transformer comprises a magnetic transformer or an electronic transformer; and select a compatibility mode of operation from a plurality of modes of operation based on the determination of whether the transformer comprises a magnetic transformer or an electronic transformer.

In accordance with these and other embodiments of the present disclosure, a method for providing compatibility between a load and a secondary winding of a transformer driven at its primary winding by a dimmer may include determining from a transformer secondary signal whether the transformer comprises a magnetic transformer or an electronic transformer and selecting a compatibility mode of operation from a plurality of modes of operation based on the determination of whether the transformer comprises a magnetic transformer or an electronic transformer.

In accordance with these and other embodiments of the present disclosure, an apparatus may include a controller to provide compatibility between a load and a secondary winding of a magnetic transformer driven at its primary winding by a trailing-edge dimmer, wherein the controller is configured to determine from a magnetic transformer secondary signal a period of a half-line cycle of an output signal of the dimmer, determine from the magnetic transformer secondary signal an estimated occurrence of an end of a phase-cut angle of the dimmer, generate a driving signal to the load based on the period and the estimated occurrence of the end of the phase-cut angle.

In accordance with these and other embodiments of the present disclosure, a method for providing compatibility between a load and a secondary winding of a magnetic transformer driven at its primary winding by a trailing-edge dimmer may include determining from a magnetic transformer secondary signal a period of a half-line cycle of an output signal of the dimmer, determining from the magnetic transformer secondary signal an estimated occurrence of an end of a phase-cut angle of the dimmer, and generating a driving signal to the load based on the period and the estimated occurrence of the end of the phase-cut angle.

In accordance with these and other embodiments of the present disclosure, a lamp assembly may include a lamp for generating light and a controller for controlling operation of the lamp, the controller comprising a timing control circuit for determining a period of a periodic signal received by the lamp assembly.

In accordance with these and other embodiments of the present disclosure, an apparatus may include a controller to provide compatibility between a load and a secondary winding of an electronic transformer driven by a trailing-edge dimmer, wherein the controller is configured to predict based on an electronic transformer secondary signal an estimated occurrence of a high-resistance state of the trailing-edge dimmer, wherein the high-resistance state occurs when the trailing-edge dimmer begins phase-cutting an alternating current voltage signal and operate in a high-current mode for a period of time immediately prior to the estimated occurrence of the high-resistance state.

In accordance with these and other embodiments of the present disclosure, a method for providing compatibility between a load and a secondary winding of an electronic transformer driven by a trailing-edge dimmer may include predicting based on of an electronic transformer secondary signal an estimated occurrence of a high-resistance state of the trailing-edge dimmer, wherein the high-resistance state occurs when the trailing-edge dimmer begins phase-cutting an alternating current voltage signal and operating the load in a high-current mode for a period of time immediately prior to the estimated occurrence of the high-resistance state.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 9:
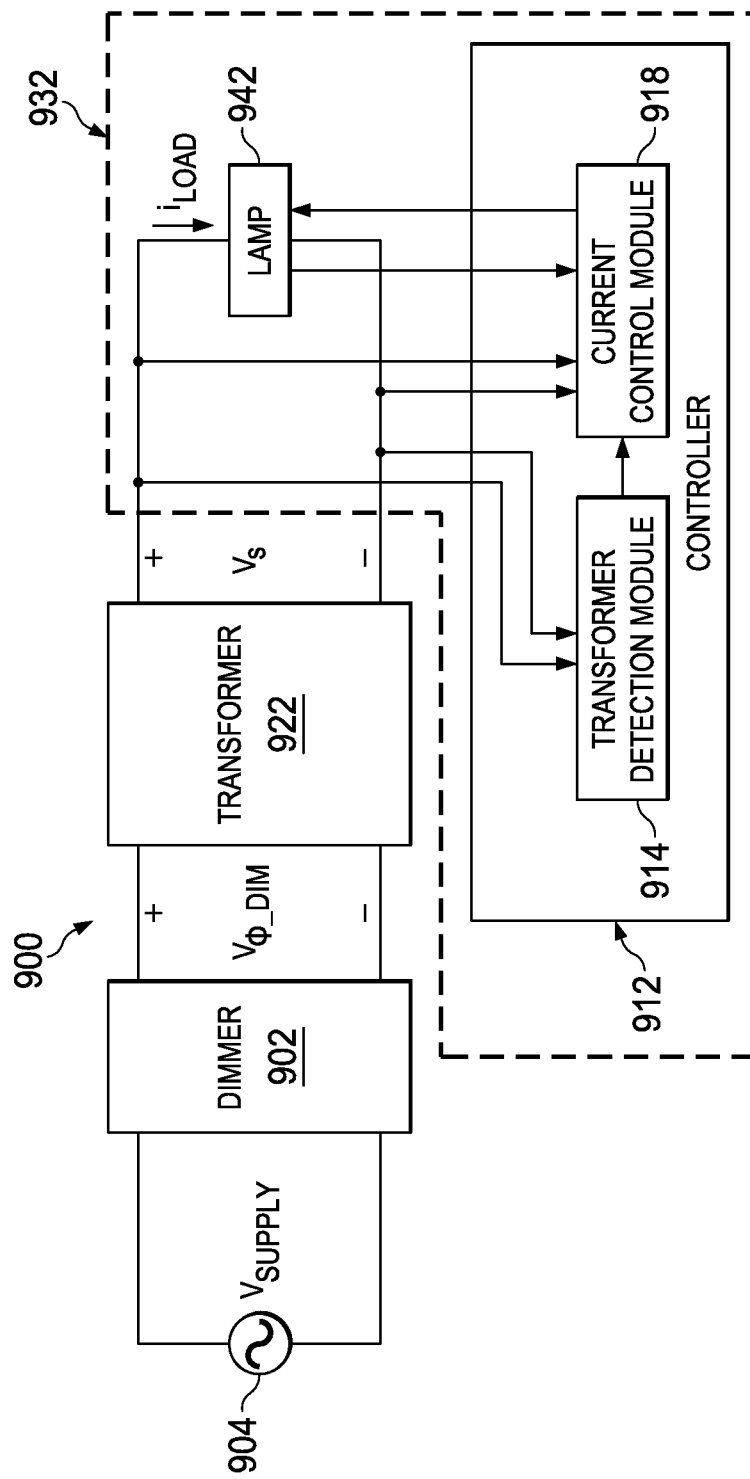
FIG. 9 illustrates an example lighting system including a controller for providing compatibility between a low-power lamp and other elements of a lighting system, in accordance with embodiments of the present disclosure.

FIG. 9 illustrates an example lighting system 900 including a controller 912 for providing compatibility between a low-power lamp 942 and other elements of a lighting system, in accordance with embodiments of the present disclosure. As shown in FIG. 9, lightning system 900 may include a voltage supply 904, a dimmer 902, a transformer 922, a lamp 942, and a controller 912. Voltage supply 904 may generate a supply voltage $V_{SUPPLY}$ that is, for example, a nominally 60 Hz/110 V line voltage in the United States of America or a nominally 50 Hz/220 V line voltage in Europe.

Figure 1:
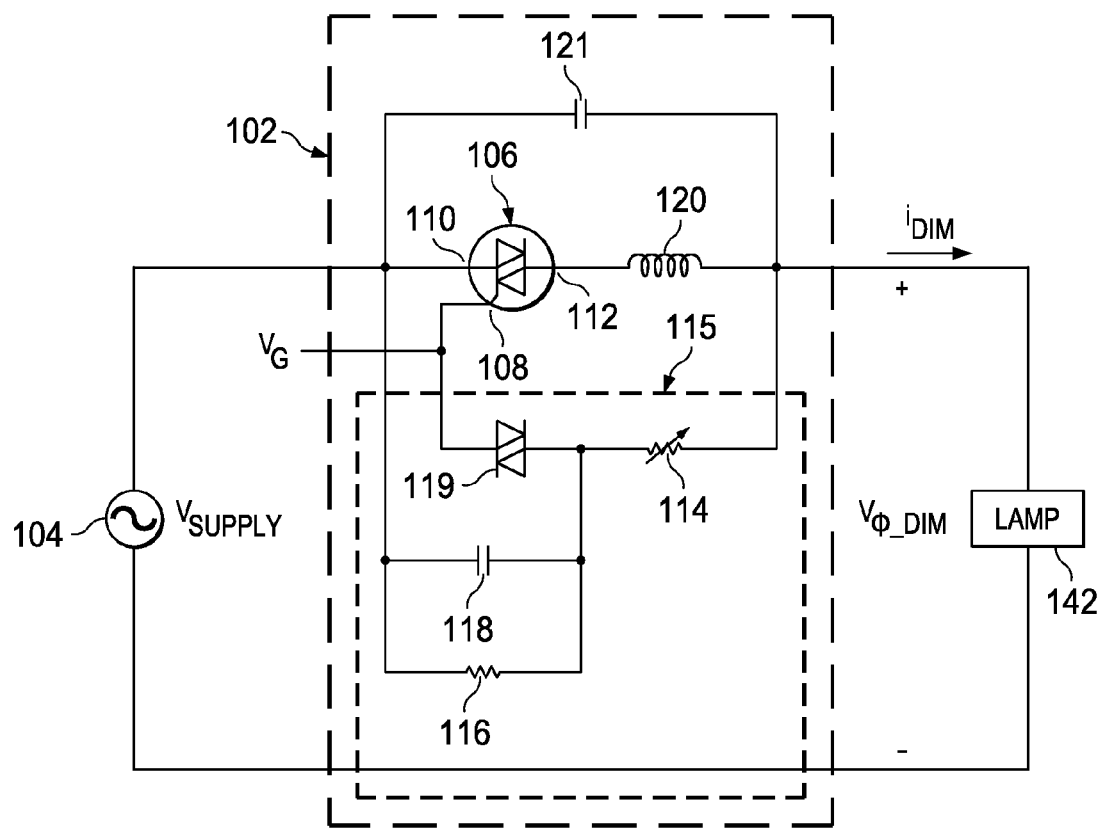
FIG. 1 illustrates a lighting system that includes a triac-based leading-edge dimmer, as is known in the art.
Figure 8:
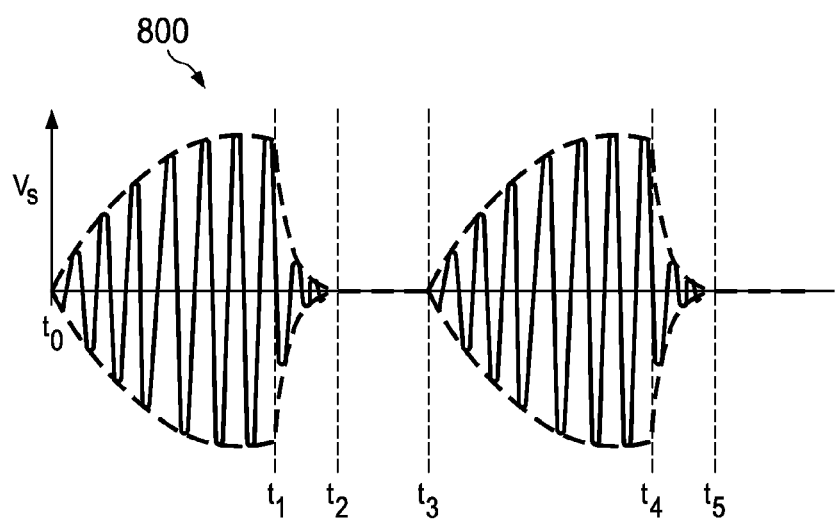
FIG. 8 illustrates example voltage and current graphs associated with the lighting system depicted in FIG. 7, as is known in the art.
Figure 2:
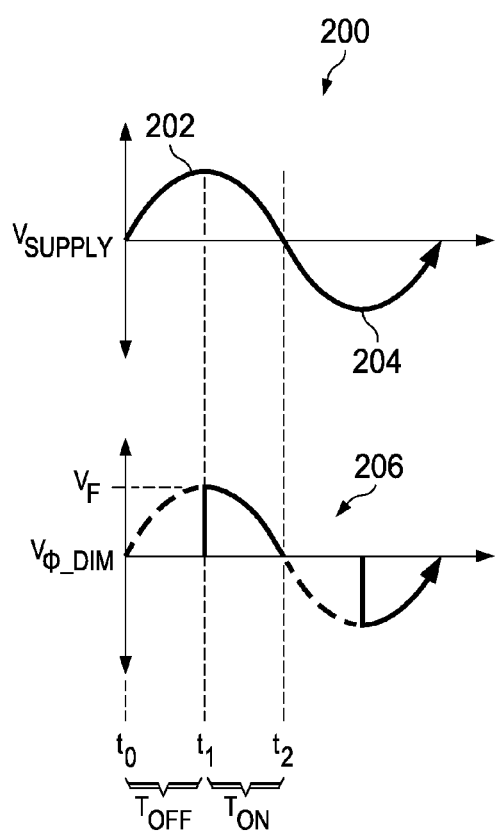
FIG. 2 illustrates example voltage and current graphs associated with the lighting system depicted in FIG. 1, as is known in the art.
Figure 3:
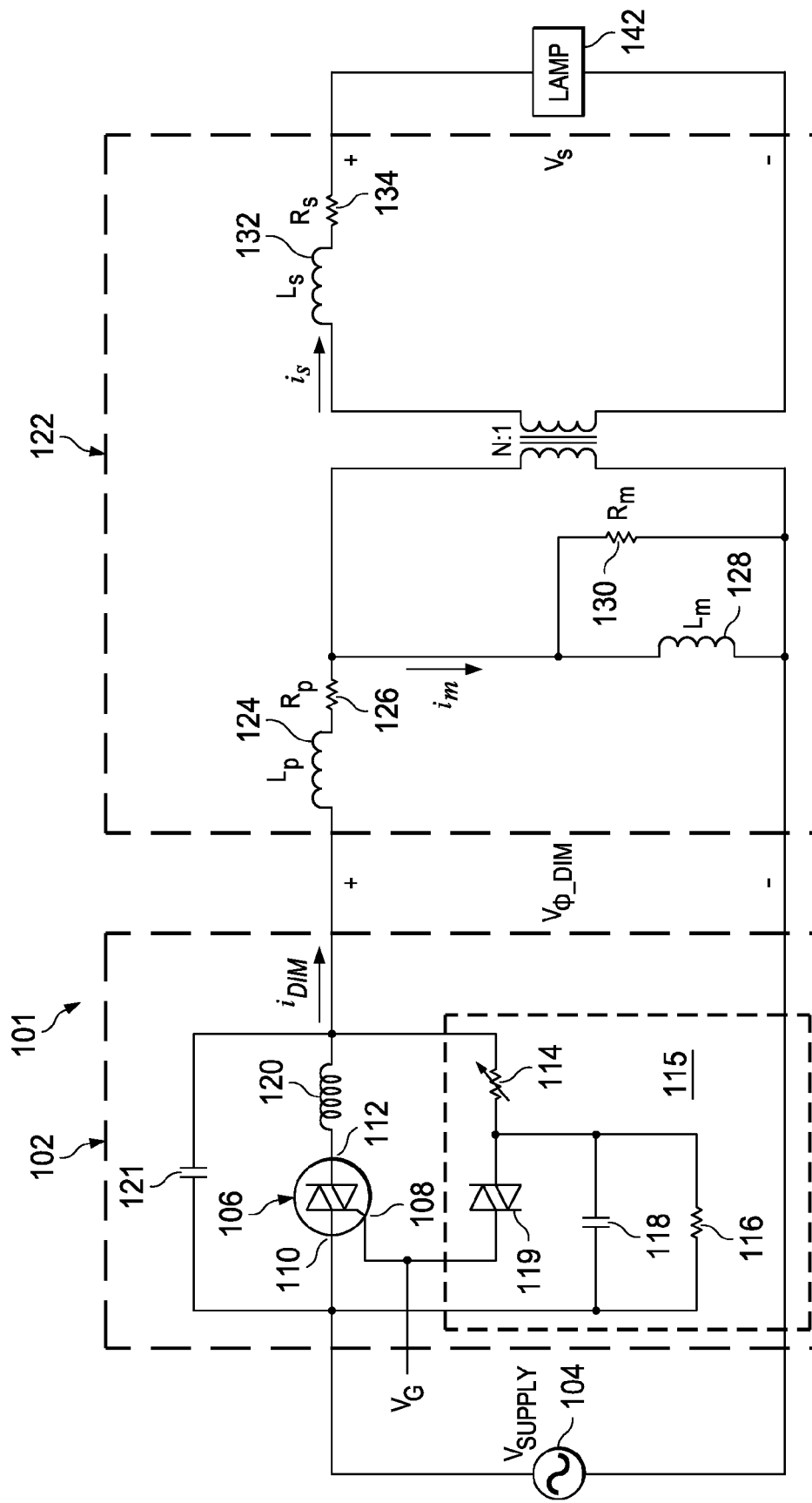
FIG. 3 illustrates a lighting system that includes a triac-based leading-edge dimmer and a magnetic transformer, as is known in the art.
Figure 5:
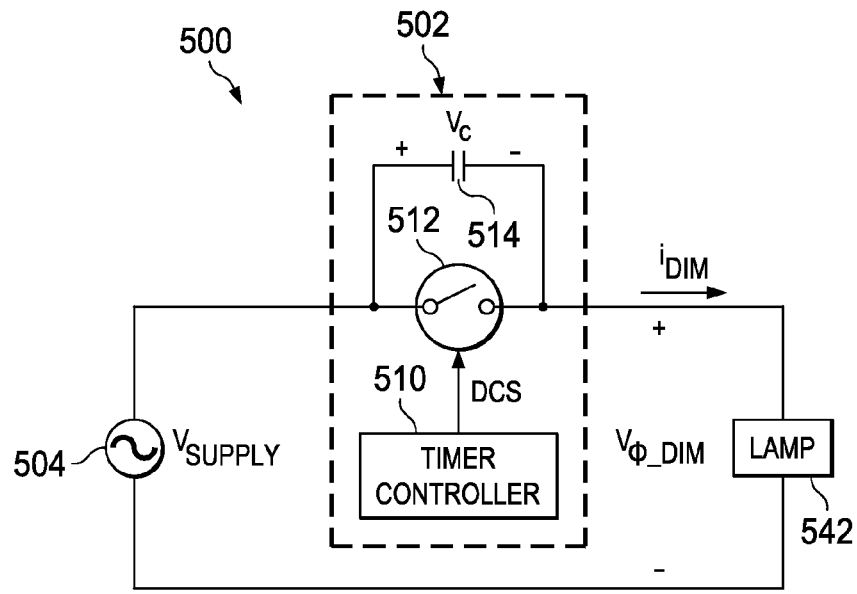
FIG. 5 illustrates a lighting system that includes a phase-cut trailing-edge dimmer, as is known in the art.
Figure 6:
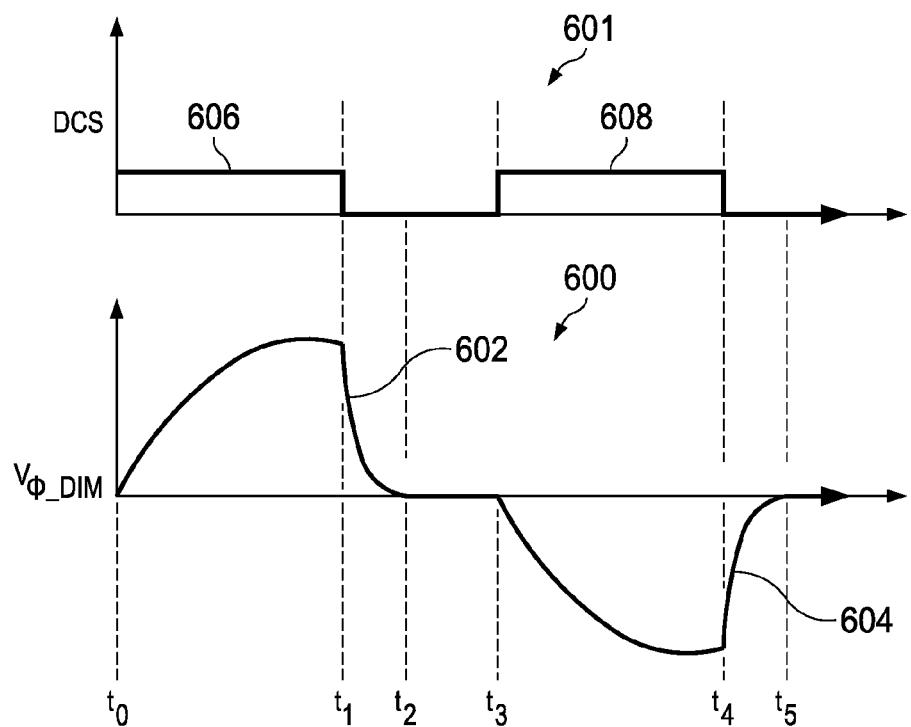
FIG. 6 illustrates example voltage and current graphs associated with the lighting system depicted in FIG. 5, as is known in the art.
Figure 7:
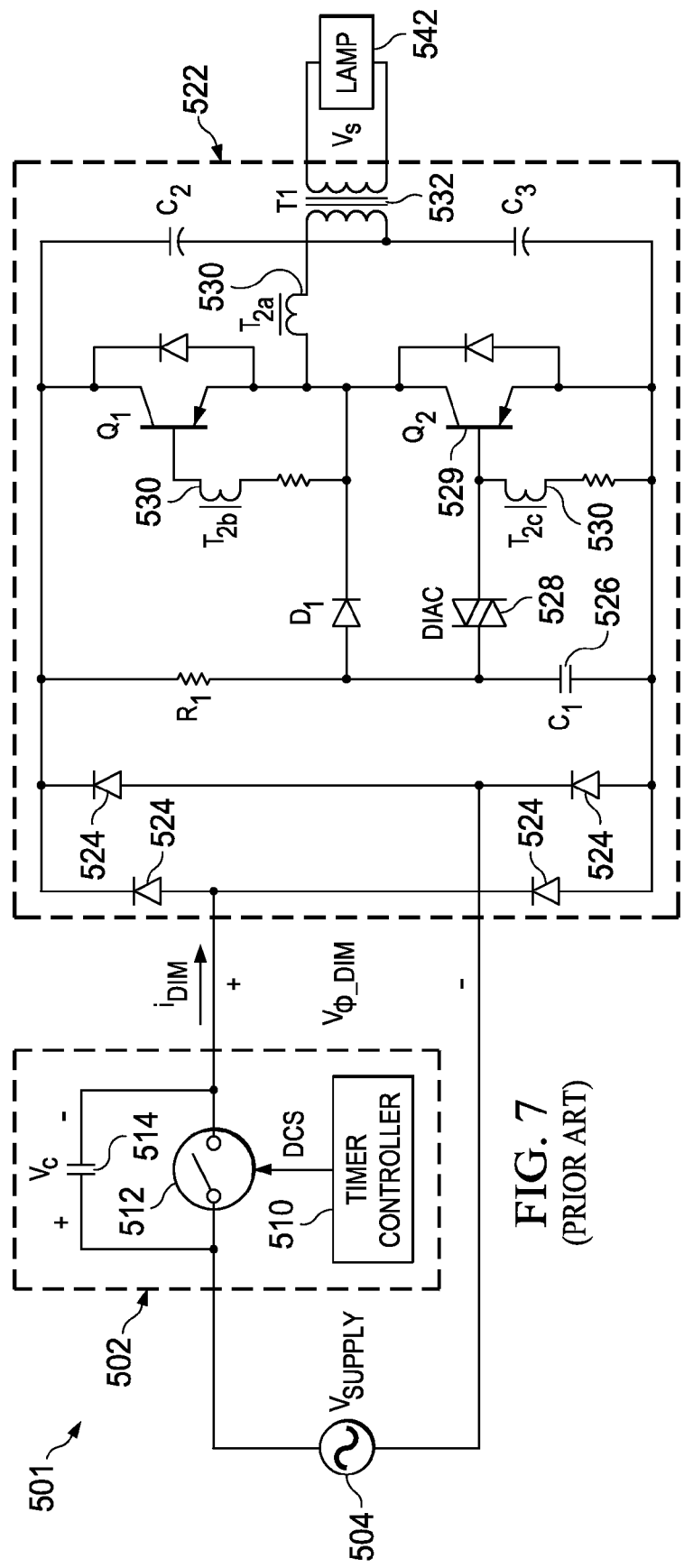
FIG. 7 illustrates a lighting system that includes a phase-cut trailing-edge dimmer and an electronic transformer, as is known in the art.

Dimmer 902 may comprise any system, device, or apparatus for generating a dimming signal to other elements of lighting system 900, the dimming signal representing a dimming level that causes lighting system 900 to adjust power delivered to a lamp, and, thus, depending on the dimming level, increase or decrease the brightness of lamp 942. Thus, dimmer 902 may include a leading-edge dimmer similar or identical to that depicted in FIGS. 1 and 3, a trailing-edge dimmer similar to that depicted in FIGS. 5 and 7, or any other suitable dimmer.

Transformer 922 may comprise any system, device, or apparatus for transferring energy by inductive coupling between winding circuits of transformer 922. Thus, transformer 922 may include a magnetic transformer similar or identical to that depicted in FIG. 3, an electronic transformer similar to that depicted in FIG. 7, or any other suitable transformer.

Lamp 942 may comprise any system, device, or apparatus for converting electrical energy (e.g., delivered by transformer 922) into photonic energy. In some embodiments, lamp 942 may comprise a multifaceted reflector form factor (e.g., an MR16 form factor). In these and other embodiments, lamp 942 may comprise an LED lamp.

Controller 912 may comprise any system, device, or apparatus configured to, as described in greater detail elsewhere in this disclosure, determine from analyzing a transformer secondary signal whether transformer 922 comprises a magnetic transformer or an electronic transformer, select a compatibility mode of operation from a plurality of modes of operation based on the determination of whether the transformer comprises a magnetic transformer or an electronic transformer, and operate lamp 942 in accordance with such selected compatibility mode. As shown in FIG. 9, controller 912 may comprise a transformer detection module 914 and a current control module 918.

As shown in FIG. 9, controller 912 and lamp 942 may be integral to the same lamp assembly 932 (e.g., the same package), wherein such lamp assembly 932 is configured to be electrically coupled to transformer 922.

Transformer detection module 914 may comprise any system, device, or apparatus configured to determine from analyzing a transformer secondary signal whether transformer 922 comprises a magnetic transformer or an electronic transformer. In some embodiments, transformer detection module 914 may be configured to determine whether transformer 922 is a magnetic transformer or an electronic transformer based on a frequency of oscillation of the transformer secondary signal. For example, if the frequency of oscillation of the transformer secondary signal is greater than a particular predetermined threshold frequency, transformer detection module 914 may determine that transformer 922 is an electronic transformer, while if the frequency of oscillation of the transformer secondary signal is lesser than the same or a different predetermined threshold frequency, transformer detection module 914 may determine that transformer 922 is a magnetic transformer. An example embodiment of transformer detection module 914 is depicted in FIG. 10.

Figure 10:
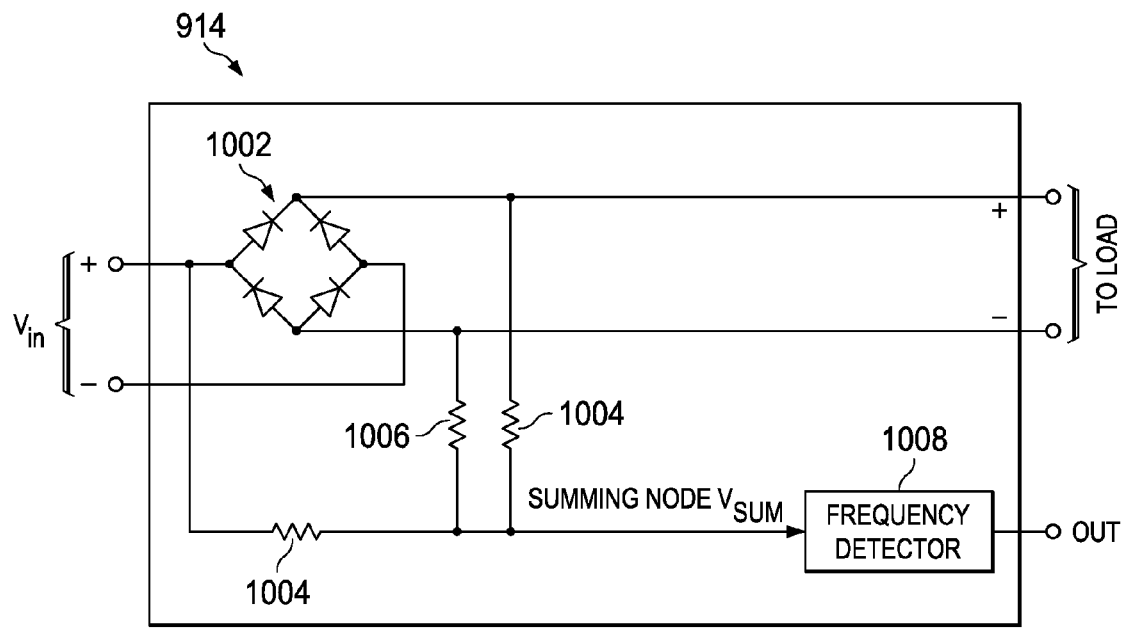
FIG. 10 illustrates an example transformer detection module, in accordance with embodiments of the present disclosure.
Figure 11A:
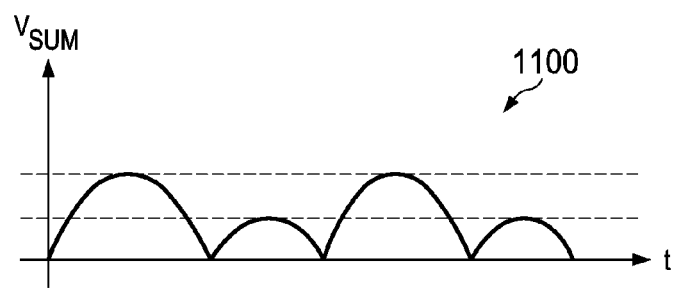
FIGS. 11A and 11B illustrate example voltage graphs associated with the transformer detection module illustrated in FIG. 10, in accordance with embodiments of the present disclosure.
Figure 11B:
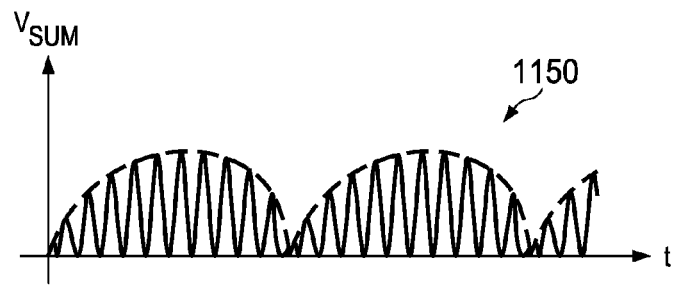

In the example embodiment of FIG. 10, transformer detection module 914 may receive an input voltage $V_{in}$ which may be the output voltage of transformer 922. Such input voltage may be rectified by bridge rectifier 1002 and two sense resistors 1004 may be coupled to each other at a summing node and to each of a positive polarity of the input voltage and a positive polarity of the output of rectifier 1002. Another resistor 1006 may be coupled between a negative polarity of the output of the rectifier and the sense resistors 1004 at the summing node in order to form a voltage divider such that a voltage $v_{sum}$ appears at the summing node. FIG. 11A depicts an example voltage waveform 1100 for voltage $v_{sum}$ at the summing node in the event that a magnetic transformer is present, while FIG. 11B depicts an example waveform 1150 for voltage $v_{sum}$ at the summing node in the event that an electronic transformer is present in accordance with embodiments of the present disclosure. As seen in FIGS. 11A and 11B, the frequency response of the summing node in the presence of a magnetic transformer is of a much lower frequency than that of the electronic transformer. Thus, frequency detector 1008, which may comprise any suitable system, device or apparatus for detecting the frequency of a periodic signal as is known by those in the art, may determine whether the frequency at the summing node is greater than a particular predetermined threshold frequency, and thus output a transformer indication signal indicating the presence of an electronic transformer, or may determine whether the frequency at the summing node is less than the same or a different predetermined threshold frequency, and thus output a transformer indication signal indicating presence of a magnetic transformer.

In addition, where a magnetic transformer is detected, frequency detector 1008 may also be able to determine phase imbalances between the phases of waveform 1100 based on different waveform amplitudes between the phases. Based on such determination, current control module 918 may determine current drawn from magnetic transformer 922 in each phase and correct for such imbalance, as described below.

Returning again to FIG. 9, current control module 918 may receive the transformer indication signal from transformer detection module 914 and, based on such signal, operate in one of a plurality of compatibility modes of operation, as described in greater detail elsewhere in this disclosure. For example, if the transformer indication signal indicates that transformer 922 is a magnetic transformer, current control module 918 may operate in a magnetic transformer compatibility mode of operation. Alternatively, if the transformer indication signal indicates that transformer 922 is an electronic transformer, current control module 918 may operate in an electronic transformer compatibility mode of operation.

Figure 12:
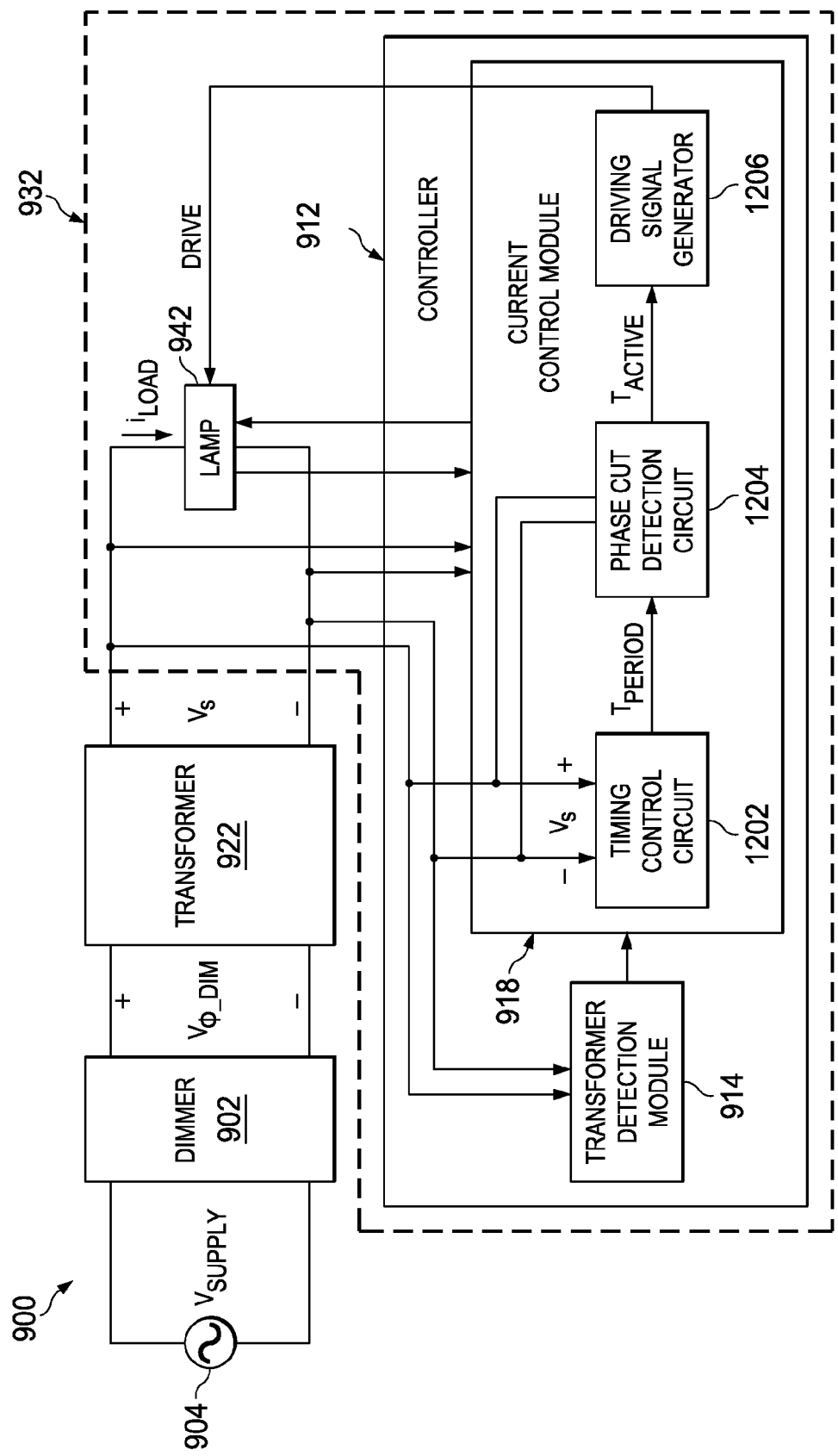
FIG. 12 illustrates the example lighting system of FIG. 9, with detail illustrating example components of a current control module for operating in a magnetic transformer compatibility mode of operation, in accordance with embodiments of the present disclosure.

FIG. 12 illustrates the example lighting system 900 of FIG. 9, with detail illustrating example components of current control module 918 for operating in a magnetic transformer compatibility mode of operation in accordance with embodiments of the present disclosure. For purposes of illustration, while current control module 918 may include components for operating in an electronic transformer compatibility mode of operation, such components are not depicted in FIG. 12. As shown in FIG. 12, current control module 918 may include a timing control circuit 1202, a phase cut detection circuit 1204, and driving signal generator 1206.

Timing control circuit 1202 may be any system, device, or apparatus configured to analyze a signal (e.g., transformer secondary voltage signal $V_s$) to determine a period of a half-line cycle of an output signal of dimmer 902. In some embodiments, timing control circuit 1202 may comprise a phase-locked loop. In other embodiments, timing control circuit 1202 may comprise a delay-locked loop. Timing control circuit 1202 may communicate a signal $T_{period}$ indicative of the determined period of the half-line cycle to phase cut detection circuit 1204.

Figure 4:
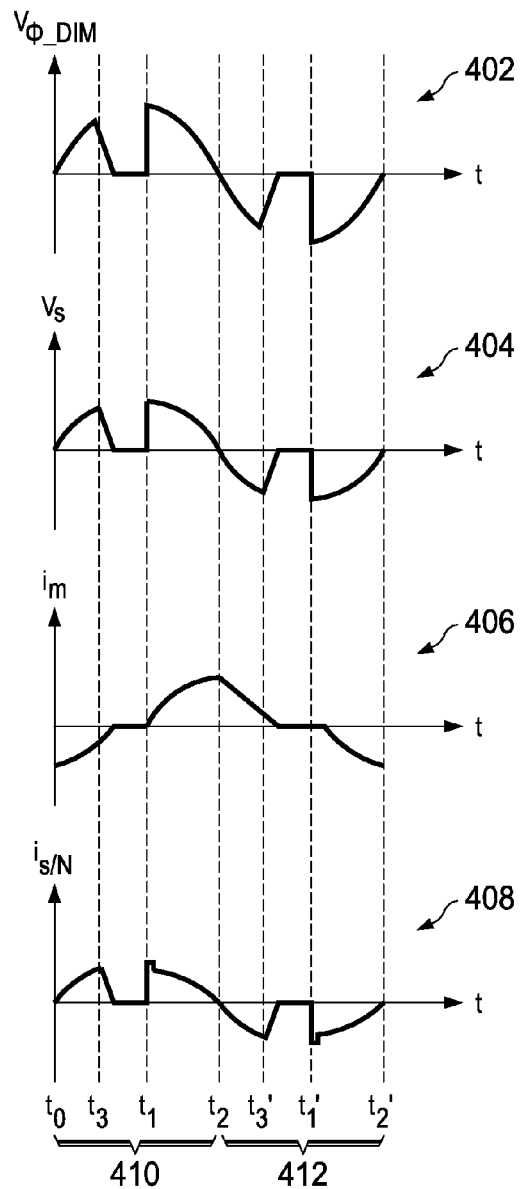
FIG. 4 illustrates example voltage and current graphs associated with the lighting system depicted in FIG. 3, as is known in the art.

Phase cut detection circuit 1204 may comprise any system, device, or apparatus configured to analyze a signal (e.g., transformer secondary voltage signal $V_s$) to determine an estimated occurrence of an end of a phase-cut angle of dimmer 902 and based on the half-line cycle period and estimated occurrence of the end of the phase-cut angle, generate a signal indicative of the portion of the half-line cycle period in which dimmer 902 is active (e.g., ON). Phase cut detection circuit 1204 may communicate a signal $T_{active}$ indicative of the portion of the half-line cycle period in which dimmer 902 is active to driving signal generator 1206. For example, phase cut detection circuit 1204 may be configured to determine the estimated occurrence of the end of the phase-cut angle based on at least a determination of an estimated time at which transformer secondary voltage signal $V_s$ exceeds a predetermined threshold magnitude (e.g., so as to detect the occurrence of times analogous to times $t_1$, $t_1'$ depicted in FIG. 4). In addition or alternatively, phase cut detection circuit 1204 may be configured to determine the estimated occurrence of the end of the phase-cut angle based on at least a determination of an estimated time at which transformer secondary voltage signal $V_s$ falls below a predetermined threshold magnitude (e.g., so as to detect the occurrence of times analogous to times $t_3$, $t_3'$ depicted in FIG. 4). In addition or alternatively, phase cut detection circuit 1204 may be configured to determine the estimated occurrence of the end of the phase-cut angle based on at least a determination of an estimated continuous period of time in which transformer secondary voltage signal $V_s$ remains above a predetermined threshold magnitude. Such determination of a time or times in reference to one or more threshold magnitudes may be performed in any suitable manner, including use of one or more comparator circuits to determine the occurrence or occurrences of threshold crossing. Based on a further comparison of the timing of the estimated occurrence of such a threshold crossing relative to the signal periodicity generated by timing control circuit 1202, phase cut detection circuit 1204 may be able to determine the portion of the half-line cycle period in which dimmer 902 is active.

In addition, driving signal generator 1206 may, based on a phase imbalance determined by transformer detection module, correct for such imbalance to make up for differing amplitudes flowing from transformer 922.

Driving signal generator 1206 may comprise any system, device, or apparatus for receiving a signal indicative of a portion of a half-line cycle period in which dimmer 902 is active and based on such signal, generate a driving signal indicative of an intensity of light to be generated by lamp 942, and communicate such driving signal to lamp 942. In some embodiments, driving signal generator 1206 may be configured to apply a mathematical function (e.g., a linear or polynomial function) to convert the signal indicative of a portion of a half-line cycle period in which dimmer 902 is active to the driving signal. In other embodiments, driving signal 1206 may comprise a lookup table or other similar data structure in which various driving signal levels are indexed by values for the signal indicative of a portion of a half-line cycle period in which dimmer 902 is active.

Figure 13:
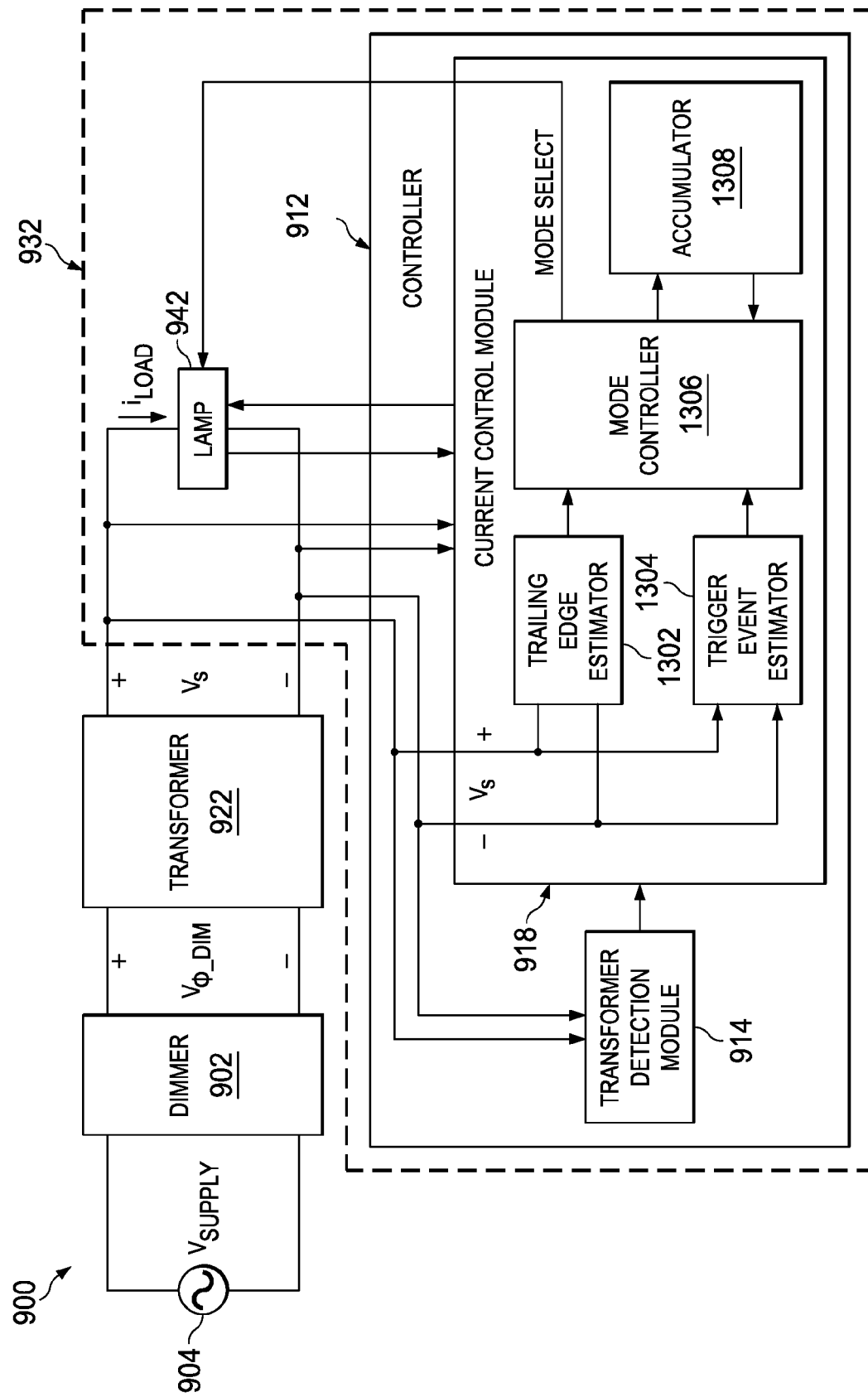
FIG. 13 illustrates the example lighting system of FIG. 9, with detail illustrating example components of a current control module for operating in an electronic transformer compatibility mode of operation, in accordance with embodiments of the present disclosure.
Figure 14:
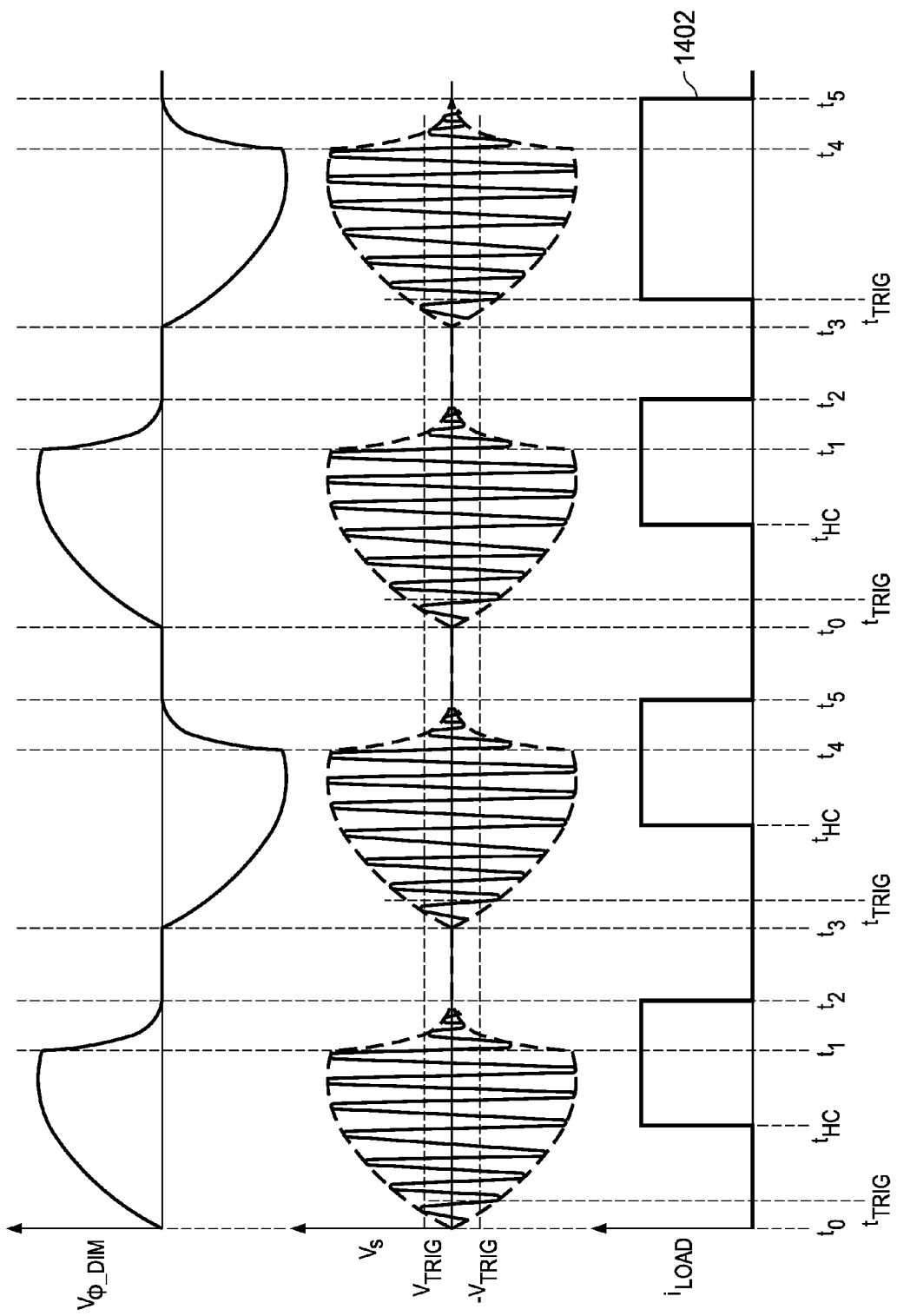
FIG. 14 depicts example voltage and current graphs associated with the lighting system depicted in FIG. 13, in accordance with embodiments of the present disclosure.

FIG. 13 illustrates the example lighting system 900 of FIG. 9, with detail illustrating example components of current control module 918 for operating in an electronic transformer compatibility mode of operation. FIG. 14 depicts example voltage and current graphs associated with lighting system 900 depicted in FIG. 13, in accordance with embodiments of the present disclosure.

For purposes of illustration, while current control module 918 may include components for operating in a magnetic transformer compatibility mode of operation, such components are not depicted in FIG. 13. As shown in FIG. 13, current control circuit 918 may include a trailing edge estimator 1302, trigger event estimator 1304, mode controller 1306, and accumulator 1308.

Trailing edge estimator 1302 may include any system, device, or apparatus configured to, based on analysis of a transformer secondary signal $V_s$, predict an estimated occurrence of a high-resistance state of dimmer 902, the high-resistance state occurring when the dimmer begins phase-cutting an alternating current voltage signal (e.g., where dimmer 902 is a trailing-edge dimmer, the trailing edge). Thus, referring to FIG. 14, trailing edge estimator 1302 may predict or estimate the occurrence of times labeled $t_1$ and $t_4$. The estimated occurrence of the high-resistance state may be predicted in any suitable manner, for example, using systems and methods disclosed in U.S. patent application Ser. No. 13/298,002 filed Nov. 16, 2011 and entitled "Trailing Edge Dimmer Compatibility with Dimmer High Resistance Prediction," which is incorporated in its entirety herein for all purposes. Trailing edge estimator 1302 may communicate a trailing edge estimate signal indicative of the estimated occurrence of a high-resistance state of dimmer 902 to mode controller 1306.

Trigger event estimator 1304 may include any system, device, or apparatus configured to, based on analysis of a transformer secondary signal $V_s$, predict an estimated occurrence of a trigger event of the electronic transformer, the trigger event corresponding to a rise in an output voltage of dimmer 902. Thus, referring to FIG. 14, trigger event estimator 1304 may predict or estimate the occurrence of times labeled $t_0$ and $t_3$. In some embodiments, trigger event estimator 1304 may estimate the occurrence of the trigger event by determining a time at which voltage $V_s$ exceeds a threshold trigger voltage $V_{TRIG}$. Such determination of a time or times in reference to the threshold trigger voltage $V_{TRIG}$ may be performed in any suitable manner, including use of one or more comparator circuits to determine the occurrence or occurrences of threshold crossing. Trigger event estimator 1304 may communicate a trigger event estimate signal indicative of the estimated occurrence of the trigger event to mode controller 1306.

Mode controller 1306 may include any system, device, or apparatus configured to, based on a trailing edge estimate signal communicated from trailing edge estimator 1302, a trigger event estimate signal communicated from trigger event estimator 1304, and/or an accumulated error signal communicated from accumulator 1308, generate a mode select signal in order to select a particular mode for lamp 942. For example, as shown by the waveform for lamp 942 current $i_{LOAD}$ on FIG. 14, based on a control setting of dimmer 902, mode controller 1306 may cause current control module 918 (and thus lamp 942) to operate in a high-current mode from a period beginning at a high-current mode start time $t_{HC}$ and ending at approximately the estimated occurrence of the high-resistance state of dimmer 902, (e.g., a time $t_2$ or $t_5$, once voltage $V_S$ has decayed to zero). Such control setting of dimmer 902 is thus estimated based on the estimated occurrence of a high-resistance state of dimmer 902 as indicated by the trailing edge estimate signal and the estimated occurrence of the trigger event as indicated by the trailing edge estimate signal. Mode controller 1306 may determine the high-current mode start time $t_{HC}$ based on the accumulated error signal communicated from accumulator 1308 in order to correct for errors in the amount of energy delivered to lamp 942 in previously occurring cycles of voltage $V_s$, as described in greater detail below.

As another example, based on the estimated occurrence of a high-resistance state of dimmer 902 as indicated by the trailing edge estimate signal and the estimated occurrence of a trigger event as indicated by the trigger event estimate signal, mode controller 1306 may cause current control module 918 (and thus lamp 942) to operate in a low-impedance mode from a period beginning at the high-resistance state of dimmer 902 (e.g., a time $t_2$ or $t_5$) and ending at the subsequent trigger event time $t_{TRIG}$. During such low-impedance mode, output voltages of dimmer 902 and transformer 922 may be kept low in order to permit dimmer 902 to reset for its next phase-cut cycle.

As a further example, based on the estimated occurrence of a trigger event as indicated by the trigger event estimate signal, mode controller 1306 may cause current control module 918 (and thus lamp 942) to operate in a high-impedance mode from a period beginning at the trigger event time $t_{TRIG}$ and ending at the beginning of the subsequent high-current mode occurring at a time $t_{HC}$.

Thus, mode controller 1306 may, based on a trailing edge estimate signal communicated from trailing edge estimator 1302, a trigger event estimate signal communicated from trigger event estimator 1304, and/or an accumulated error signal communicated from accumulator 1308, sequentially and cyclically operate in the high-current mode, the low-impedance mode, and the high-impedance mode.

Mode controller 1306 may additionally be configured to, during each particular operation in the high-current mode, determine a target amount of energy to be delivered to lamp 942 during the particular operation of the high-current mode. In some embodiments, such target amount of energy may be based on a control setting of dimmer 902, and an estimate of such control setting may be made by calculating the aggregate duration of the high-current mode and the high-impedance mode. In addition, mode controller 1306 may be configured to, during the particular operation of the high-current mode, determine an estimated delivered amount of energy actually delivered to lamp 942. In some embodiments, such estimated delivered amount of energy may be calculated based on the duration of the high-current mode. Furthermore, mode controller 1306 may be configured to calculate an error based on the difference between the target amount of energy and the estimated delivered amount of energy, and calculate an error signal to accumulator 1308 based on such error.

Accumulator 1308 may include any system, device, or apparatus configured to, based on an error signal communicated from mode controller 1306, calculate an accumulated error accumulated during multiple preceding operations in the high-current mode, and communicate an accumulated error signal to mode controller 1306 indicative of such accumulated error. As discussed above, such accumulated error signal may be used by mode controller 1306 to determine a duration of a high-current mode (e.g., high-current mode start time $t_{HC}$ may be modulated as a function of the accumulated error). Thus, an error accumulated during one or more operations in the high-current mode may be corrected, in whole or part, in one or more subsequent operations in the high-current mode by varying the duration of high-current modes.

In addition to varying the duration of high-current modes, mode controller 1306 may correct for error by causing the duration for a particular operation in the high-current mode to begin at the estimated occurrence of the trigger event, as shown by pulse 1402 in FIG. 14. An operation in the high-current mode having such a duration may be referred to as a "probe event." In some embodiments, mode controller 1306 may cause a probe event to occur for each n-th operation of the high-current mode, where n is a positive integer. In particular embodiments, n may be an odd positive integer. When a probe event occurs, mode controller 1306 may eliminate the high-impedance mode that would have otherwise occurred immediately preceding the high-current mode comprising the probe event.

Figure 15:
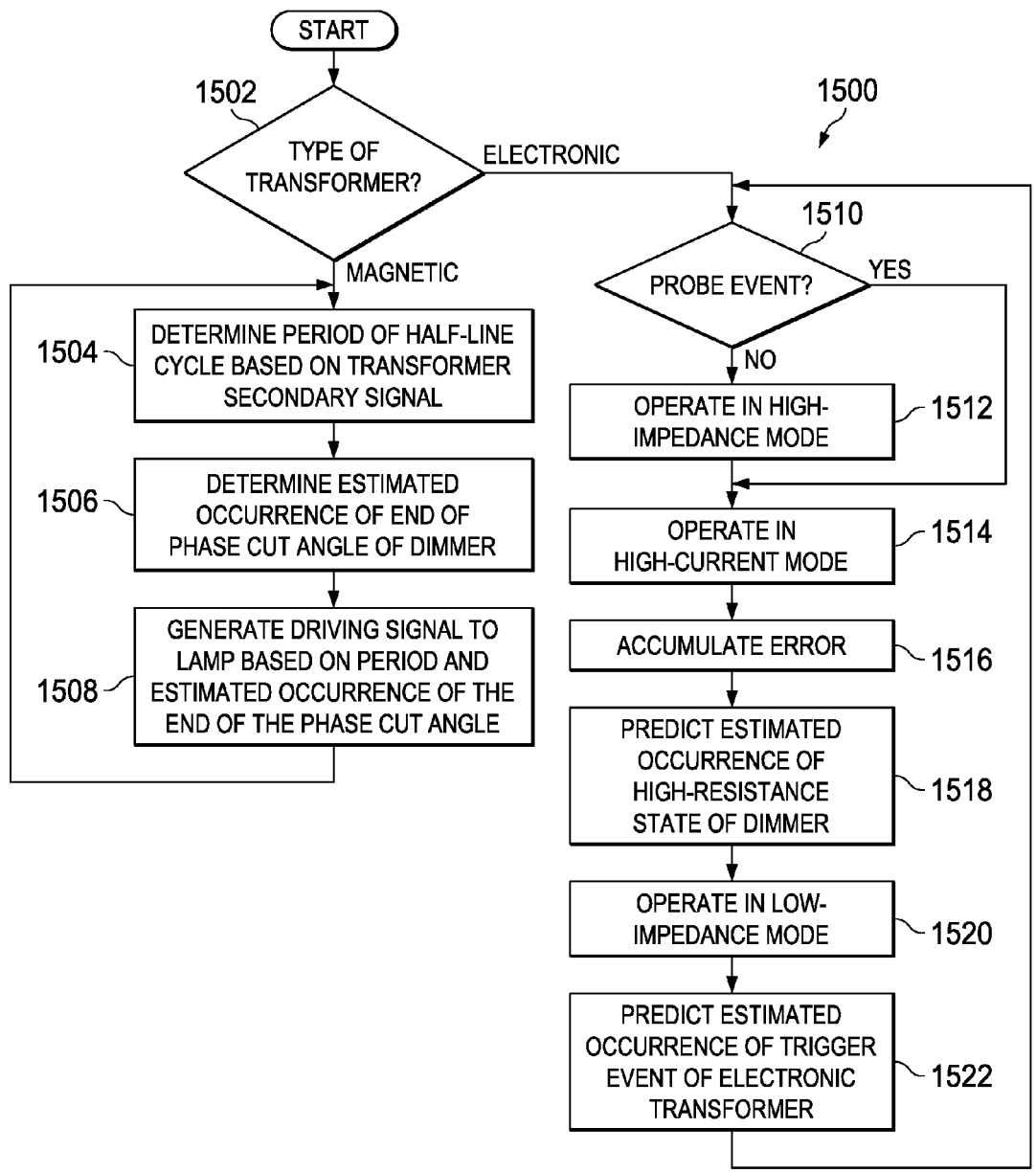
FIG. 15 illustrates a flow chart of an example method 1500 for ensuring compatibility between a lamp and a transformer driver by a dimmer, in accordance with embodiments of the present disclosure.

FIG. 15 illustrates a flow chart of an example method 1500 for ensuring compatibility between a lamp and a transformer driver by a dimmer, in accordance with embodiments of the present disclosure. According to some embodiments, method 1500 may begin at step 1502. As noted above, teachings of the present disclosure may be implemented in a variety of configurations of lighting system 900. As such, the preferred initialization point for method 1500 and the order of the steps comprising method 1500 may depend on the implementation chosen.

At step 1502, controller 912 may determine the transformer type of transformer 922. Controller 912 may make such determination based on a frequency of oscillation of a secondary voltage signal (e.g., $V_s$) of transformer 922, as described elsewhere in this disclosure. If controller 912 determines transformer 922 to be a magnetic transformer, method 1500 may proceed to step 1504. Otherwise, if controller 912 determines transformer 922 to be an electronic transformer, method 1500 may proceed to step 1510.

At step 1504, controller 912 may analyze the voltage signal of the secondary of transformer 922 to determine a period of a half-line cycle of an output signal of dimmer 902. In some embodiments, such determination may be made by a timing control circuit (e.g., a phase-locked loop or a delay-locked loop).

At step 1506, controller 912 may analyze the voltage signal of the secondary of transformer 922 to determine an estimated occurrence of an end of a phase-cut angle of dimmer 902. Controller 912 may determine the estimated occurrence of the end of the phase cut angle based at least on: (a) a determination of an estimated time at which the voltage of transformer 922 secondary exceeds a predetermined threshold magnitude; (b) a determination of an estimated time at which the voltage of transformer 922 falls below the same or a different predetermined threshold magnitude; and/or (c) a determination of an estimated portion of the period in which the magnetic transformer secondary signal is greater than the same or a different predetermined threshold magnitude.

At step 1508, controller 912 may generate a driving signal to lamp 942 based on the period and the estimated occurrence of the end of the phase-cut angle, the driving signal indicative of intensity of light to be generated by lamp 942. After completion of step 1508, method 1500 may return to step 1504, and steps 1504 to 1508 may repeat indefinitely.

At step 1510, controller 912 may determine if the subsequent operation in the high-current mode is a probe event. Such probe event may occur for each n-th operation in the high-current mode, where n is a positive integer, and in some embodiments is an odd positive integer. If the subsequent operation in the high-current mode is a probe event, method 1500 may proceed to step 1514, where the period of the operation in the high-current mode may run from the subsequent estimated occurrence of the trigger event to the subsequent estimated occurrence of the high-resistance state of dimmer 902. Otherwise, if the subsequent operation in the high-current mode is not a probe event, method 1500 may proceed to step 1512.

At step 1512, from approximately the estimated occurrence of the subsequent trigger event to the beginning of the subsequent high-current mode, controller 912 may operate in a high-impedance mode.

At step 1514, controller 912 may operate in a high-current mode for a period of time immediately prior to the occurrence of the low-impedance mode. The period of time may be based on a control setting of dimmer 902, and such control setting of dimmer 902 may be estimated based on the estimated occurrence of a high-resistance state of dimmer 902 as indicated by the trailing edge estimate signal and the estimated occurrence of the trigger event as indicated by the trailing edge estimate signal. Mode controller 1306 may determine the period of time of the high-current mode based on the accumulated error signal communicated from accumulator 1308 in order to correct for errors in the amount of energy delivered to lamp 942 in previously occurring cycles of steps 1510 to 1522, as described in greater detail elsewhere in this disclosure.

At step 1516, controller 912 may calculate an error for the operation of the high-current mode occurring at step 1514. The error may be calculated as a difference between a target amount of energy to be delivered to lamp 942 during the operation in the high-current mode and an estimated delivered amount of energy actually delivered to lamp 942 during the operation in the high-current mode. The target amount of energy may be based on a control setting of dimmer 902, which control setting may be estimated based on a period of time between the estimated occurrence of the trigger event and the estimated occurrence of the high-resistance state of dimmer 902. The estimated amount of delivered energy may be estimated based on the period of time of the high-current mode. Controller 912 may add such calculated error to an accumulated error representing an aggregation of errors from previous operations in the high-current mode. Such accumulated error may be used by controller 912 in determining the period of time for subsequent operations in the high-current mode.

At step 1518, controller 912 may predict based on analysis of the voltage signal of the secondary of transformer 922 an estimated occurrence of a high-resistance state of the dimmer 902 (e.g., when dimmer 902 begins phase-cutting an AC voltage signal at its input).

At step 1520, from approximately the estimated occurrence of the high-resistance state of dimmer 902 to approximately the estimated occurrence of the subsequent trigger event, controller 912 may operate in a low-impedance mode.

At step 1522, controller 912 may predict an estimated occurrence of a trigger event of transformer 922, the trigger event corresponding to a rise in an output voltage of dimmer 902. After completion of step 1522, method 1500 may proceed again to step 1510, and steps 1510 to 1522 may repeat indefinitely.

Although FIG. 15 discloses a particular number of steps to be taken with respect to method 1500, method 1500 may be executed with greater or lesser steps than those depicted in FIG. 15. In addition, although FIG. 15 discloses a certain order of steps to be taken with respect to method 1500, the steps comprising method 1500 may be completed in any suitable order.

Method 1500 may be implemented using controller 912 or any other system operable to implement method 1500. In certain embodiments, method 1500 may be implemented partially or fully in software and/or firmware embodied in computer-readable media.

As used herein, when two or more elements are referred to as "coupled" to one another, such term indicates that such two or more elements are in electronic communication whether connected indirectly or directly, without or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A lighting apparatus comprising:
   a controller to provide compatibility between a load and a secondary winding of an electronic transformer driven by a trailing-edge dimmer, wherein the controller is configured to:
   predict based on an electronic transformer secondary signal an estimated occurrence of a high-resistance state of the trailing-edge dimmer, wherein the high-resistance state occurs when the trailing-edge dimmer begins phase-cutting an alternating current voltage signal; and
   operate in a high-current mode for a period of time immediately prior to the estimated occurrence of the high-resistance state.

2. The apparatus of claim 1, the controller further configured to operate in a low-impedance mode immediately after the estimated occurrence of the high-resistance state.

3. The apparatus of claim 1, the controller further configured to:
   predict based on the electronic transformer secondary signal an estimated occurrence of a trigger event of the electronic transformer, the trigger event corresponding to a rise in an output voltage of the dimmer; and
   operate in a high-impedance mode immediately after the estimated occurrence of the trigger event and immediately prior to the high-current mode.

4. The apparatus of claim 3, the controller further configured to operate in a low-impedance mode immediately prior to the estimated occurrence of the high-resistance state.

5. The apparatus of claim 4, the controller further configured to sequentially and cyclically operate in the high-current mode, the low-impedance mode, and the high-impedance mode.

6. The apparatus of claim 1, wherein the controller is further configured to determine a target amount of energy to be delivered to the load during a particular operation in the high-current mode, the target amount of energy based on a control setting of the dimmer.

7. The apparatus of claim 6, the controller configured to:
   determine an estimated delivered amount of energy actually delivered to the load during the particular operation in the high-current mode;
   calculate an error based on the difference between the target amount of energy and the estimated delivered amount of energy; and
   in a subsequent operation in the high-current mode occurring after the particular operation in the high-current mode, determine a second target amount of energy to be delivered to the load during the subsequent operation in the high-current mode, the second target amount of energy based on the error and the control setting of the dimmer.

8. The apparatus of claim 6, the controller further configured to:
predict based on the electronic transformer secondary signal an estimated occurrence of a trigger event of the electronic transformer;
operate in a high-impedance mode immediately after the estimated occurrence of the trigger event and immediately prior to the high-current mode; and
estimate the control setting of the dimmer based on an aggregate duration of the high-current mode and the high-impedance mode.

9. The apparatus of claim 6, wherein the controller is configured to, for each n-th operation of the high-current mode:
predict based on the electronic transformer secondary signal an estimated occurrence of a trigger event of the electronic transformer; and
operate in the high-current mode from the estimated occurrence of the trigger event to the estimated occurrence of the high-impedance mode.

10. The apparatus of claim 9, wherein n is an odd positive integer.

11. The apparatus of claim 1, the period of time based on a control setting of the dimmer.

12. The apparatus of claim 11, the controller further configured to:
predict based on the electronic transformer secondary signal an estimated occurrence of a trigger event of the electronic transformer;
operate in a high-impedance mode immediately after the estimated occurrence of the trigger event and immediately prior to the high-current mode; and
estimate the control setting of the dimmer based on an aggregate duration of the high-current mode and the high-impedance mode.

13. The apparatus of claim 1, wherein the load comprises a lamp.

14. The apparatus of claim 13, wherein the lamp comprises a light-emitting diode lamp.

15. The apparatus of claim 13, wherein the lamp comprises a lamp having a multifaceted reflector form factor.

16. A method of using a controller for providing compatibility between a load and a secondary winding of an electronic transformer driven by a trailing-edge dimmer comprising:
predicting based on an electronic transformer secondary signal an estimated occurrence of a high-resistance state of the trailing-edge dimmer, wherein the high-resistance state occurs when the trailing-edge dimmer begins phase-cutting an alternating current voltage signal; and
operating the load in a high-current mode for a period of time immediately prior to the estimated occurrence of the high-resistance state.

17. The method of claim 16, further comprising operating in a low-impedance mode immediately after the estimated occurrence of the high-resistance state.

18. The method of claim 16, further comprising:
predicting based on the electronic transformer secondary signal an estimated occurrence of a trigger event of the electronic transformer, the trigger event corresponding to a rise in an output voltage of the dimmer; and
operating the load in a high-impedance mode immediately after the estimated occurrence of the trigger event and immediately prior to the high-current mode.

19. The method of claim 18, further comprising operating the load in a low-impedance mode immediately prior to the estimated occurrence of the high-resistance state.

20. The method of claim 19, further comprising sequentially and cyclically operating the load in the high-current mode, the low-impedance mode, and the high-impedance mode.

21. The method of claim 16, further comprising determining a target amount of energy to be delivered to the load during a particular operation in the high-current mode, the target amount of energy based on a control setting of the dimmer.

22. The method of claim 21, further comprising:
determining an estimated delivered amount of energy actually delivered to the load during the particular operation in the high-current mode;
calculating an error based on the difference between the target amount of energy and the estimated delivered amount of energy; and
in a subsequent operation in the high-current mode occurring after the particular operation in the high-current mode, determining a second target amount of energy to be delivered to the load during the subsequent operation in the high-current mode, the second target amount of energy based on the error and the control setting of the dimmer.

23. The method of claim 21, further comprising:
predicting based on the electronic transformer secondary signal an estimated occurrence of a trigger event of the electronic transformer;
operating the load in a high-impedance mode immediately after the estimated occurrence of the trigger event and immediately prior to the high-current mode; and
estimating the control setting of the dimmer based on an aggregate duration of the high-current mode and the high-impedance mode.

24. The method of claim 21, further comprising, for each n-th operation of the high-current mode:
predicting based on the electronic transformer secondary signal an estimated occurrence of a trigger event of the electronic transformer; and
operating the load in the high-current mode from the estimated occurrence of the trigger event to the estimated occurrence of the high-impedance mode.

25. The method of claim 24, wherein n is an odd positive integer.

26. The method of claim 16, the period of time based on a control setting of the dimmer.

27. The method of claim 26, further comprising:
predicting based on the electronic transformer secondary signal an estimated occurrence of a trigger event of the electronic transformer;
operating the load in a high-impedance mode immediately after the estimated occurrence of the trigger event and immediately prior to the high-current mode; and
estimating the control setting of the dimmer based on an aggregate duration of the high-current mode and the high-impedance mode.

28. The method of claim 16, wherein the load comprises a lamp.

29. The method of claim 28, wherein the lamp comprises a light-emitting diode lamp.

30. The method of claim 28, wherein the lamp comprises a multifaceted reflector form factor.

* * * * *